United States Patent [19]

Suzuki et al.

[11] Patent Number: 5,142,354
[45] Date of Patent: Aug. 25, 1992

[54] SIGNAL LEVEL CORRECTION CIRCUIT FOR A VIDEO SIGNAL

[75] Inventors: Shigeo Suzuki; Fujio Okada, both of Saitama, Japan

[73] Assignee: Fuji Photo Optical Co., Ltd., Saitama, Japan

[21] Appl. No.: 629,498

[22] Filed: Dec. 18, 1990

[30] Foreign Application Priority Data

Dec. 27, 1989 [JP] Japan .................................. 1-344293

[51] Int. Cl.⁵ ............................................ H04N 5/18
[52] U.S. Cl. ........................................ 358/34; 358/32; 358/171
[58] Field of Search ................... 358/34, 32, 171, 172

[56] References Cited

U.S. PATENT DOCUMENTS

| | | | |
|---|---|---|---|
| 3,308,235 | 3/1967 | Greiner et al. | 358/172 |
| 4,701,786 | 10/1987 | Yamanaka | 358/32 |
| 4,811,101 | 3/1989 | Yagi | 358/172 |

Primary Examiner—Howard W. Britton
Assistant Examiner—Kim Yen Vu
Attorney, Agent, or Firm—Jordan and Hamburg

[57] ABSTRACT

A signal level correction circuit for a video signal includes a voltage control amplifier for amplifying a video signal received from a solid state image sensor with different gains for the respective chrominance signals, a first clamp circuit for setting a black level in the video signal received from the amplifier, a comparator for outputting a voltage proportional to the difference between a peak holding voltage of a capacitor in the horizontal blanking period of the video signal clamped by the first clamp circuit, and a reference voltage. An adder adds the output voltage from the comparator and the video signal from the first clamp circuit. A second clamp circuit resets the black level of the amplified video signal. A γ correction circuit adjusts the γ value of the video signal from the second clamp circuit. A clipping circuit clips the dynamic ranges between the white and black level of the γ value corrected video signal. A third clamp circuit resets the black level of the video signal from the clipping circuit. An A/D converter converts the analog video signal into a digital signal.

1 Claim, 4 Drawing Sheets

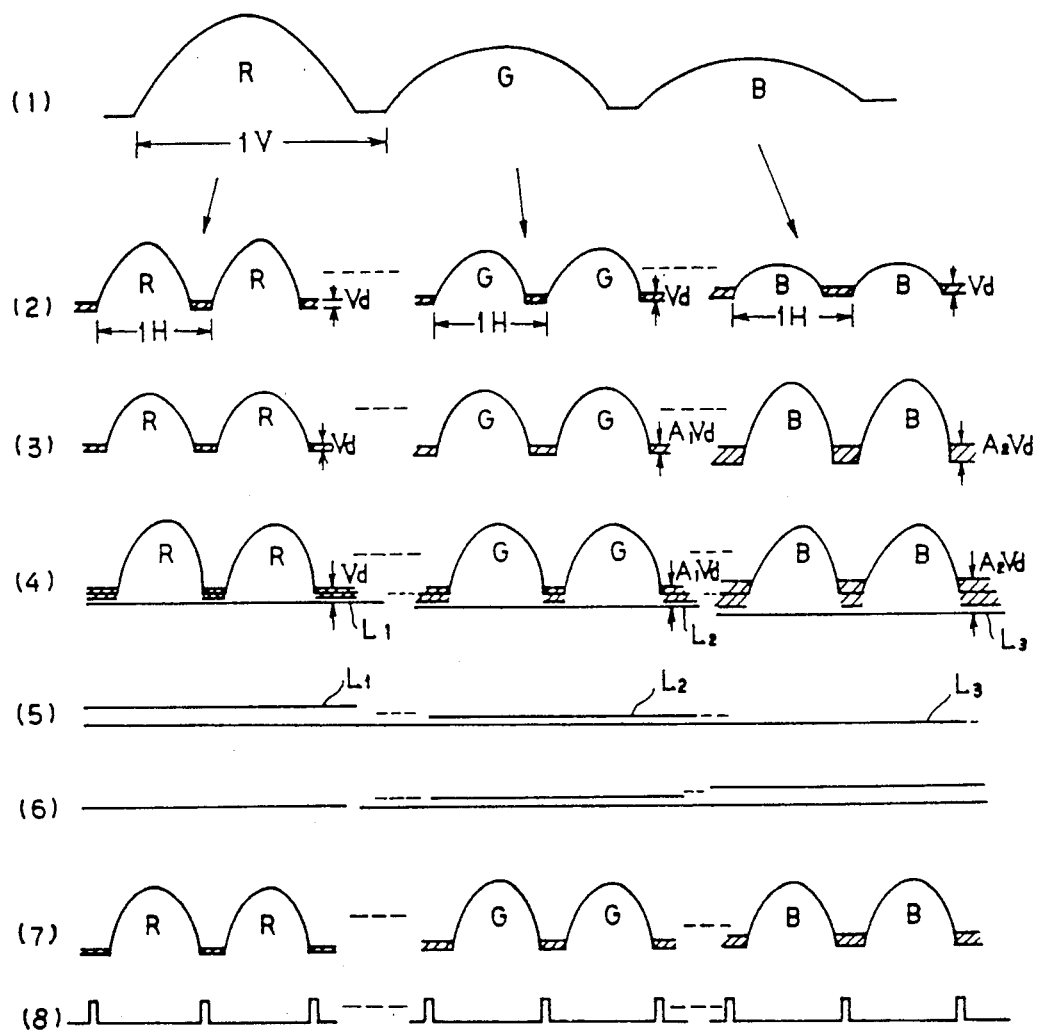
F I G . 2

SIGNAL LEVEL CORRECTION CIRCUIT FOR A VIDEO SIGNAL

BACKGROUND OF THE INVENTION

1. Field of the Invention

The present invention relates to a signal processing circuit for video signals each composed of chrominance signals different in signal level from one another, and more particularly, to a signal processing circuit used in an apparatus, such as an electronic endoscope, in which color sequential signals are processed.

2. Description of the Prior Art

In the electronic endoscope, illuminating light rays in red (R), green (G) and blue (B) are projected, as sequentially selected, to an object, video signals resulted from the illuminating light rays are provided as outputs sequentially as the time passes (color sequential signals), stored once into a memory means separately for respective chrominance signals and then read out from the memory simultaneously for reproduction as a composite video signal.

In such electronic endoscope, a solid-state image sensor (such as CCD, etc.) is usually used as the image sensor.

Since the R, G, and B chrominance singals are different in signal level from one another because of the frequency response characteristics of the solid-state image sensor, the output video signal from the solid-state image sensor will be color sequental signals different in signal level for R, G, and B signals, respectively, as shown in FIG. 2(1).

FIG. 2(1) shows each of chrominance signals in every vertical scanning period (1V). Color sequential signals in this period (1V) are shown in detail for every horizontal scanning period (1H) in FIG. 2(2). As seen from FIG. 2(2), a noise (level $V_d$ is caused by a dark current through the solid-state image sensor or other noises during the blanking period in the period (1H).

In the prior-art signal processing circuit, the gain of the amplification circuit which amplifies the signal from the solid-state image sensor is changed timely for the R, G and B chrominance signals, respectively, and these signals are so amplified as to have a same signal level as shown in FIG. 2(3).

As mentioned above, since different gains of amplification are assigned to chrominance signals, respectively, in the amplification circuit of the prior-art signal processing circuit, the amplifier gains for the G and B signals of lower signal levels are large as compared with that for the R signal, so that the noise level in the horizontal blanking periods of the G and B signals are also higher than that of the R signal. Assume that the noise level of the R signal is $V_d$ as shown in FIG. 2(3). The noise level of the G signal is $A_1 V_d$ and that of the B signal is $A_2 V_d$.

Note that $A_1$ and $A_2$ are ratios between the gains of the amplification circuit for amplification of the G and B signals, respectively, and the gain for the R signal.

Therefore, when the black level of output signal of such amplification circuit is clamped (namely, an absolute voltage value of a video signal at the black level is set), the mean value of the noise levels $V_d$, $A_1 V_d$ and $A_2 V_d$ of the chrominance signals, respectively, is clamped as an apparent black level as shown in FIG. 2(4).

As a result, the true black levels $L_1$, $L_2$ and $L_3$ are such that the potential of the R signal at the true black level $L_1$ is the highest, that of the G signal at the true black level $L_2$ is the second highest and that of the B signal at the true black level $L_3$ is the lowest as shown in FIG. 2(5).

Thus, when chrominance signals different in true black level from one another are simultaneously read out of the aforementioned memory means and processed into a composite video signal, a color imbalance of reproduced image will result and the color reproducibility be degraded.

To eliminate the above disadvantage of the prior-art signal processing technique, it was proposed that DC voltages of different values should be added to the output signals, respectively, from the clamp circuits synchronously with the R, G and B signals, respectively, so that these chrominance signals have a same black level.

However, in case of the above-mentioned addition, synchronous with the R, G and B signals of DC voltages of different values to the chrominance signals, it is difficult to adjust such DC voltage value settings and the color reproducibility of a reproduced image is poor due to even a slight deviation of the set values. Also each time the electronic endoscope is used with the existing image sensor replaced with another image sensor having an image sensor different characteristics from those of the image sensor in the existing electronic endoscope, it is necessary to set new DC voltage values for the electronic endoscope going to be used. Namely, the prior-art signal processing circuit in the electronic endoscope has only a low compatibility and is extremely poor in operability.

SUMMARY OF THE INVENTION

The present invention has an object to overcome the above-mentioned drawbacks of the prior-art techniques by providing a signal processing circuit comprising a means of automatically making true black levels for chrominance signals coincide with one another and which needs no adjustment, has a good compatibility and is excellent in color reproducibility.

The above object can be attained by providing a signal processing circuit comprising, according to the present invention, of a means for amplifying a video signal composed of chrominance signals different in signal level from one another with different gains for the respective chrominance signals; the first clamp circuit which clamps the black level of the video signal delivered from the amplifying means; a peak holding means consisting of a capacitor which detects the signal level peak in the horizontal blanking period of the video signal clamped by the first clamp circuit, a comparator which delivers via an integration circuit a voltage proportional to a difference between a discharge valtage held in the capacitor and reference voltage of the comparator, etc.; an adder which adds the output voltage from the peak holding means to the video signal from the first clamp circuit; the second amplification circuit which amplifies the video signal of which the black level has been corrected by the adder and the second clamp circuit wich clamps the black level of the amplified video signal; a γ correction circuit which adjusts the γ values and dynamic range of the video signal and then re-sets the black level; a clip circuit; the third clamp circuit; and an A/D converter wich converts the video signal, namely, an analog signal, into a digital signal.

In the signal processing circuit according to the present invention, the signal level peak in the horizontal blanking period of the clamped video signal is detected, and a voltage proportional to the difference between the peak and the reference value connected to the comparator is added to the clamped video signal via the comparator. Therefore, since the superposed dark currents during the horizontal blanking period and levels of noise components are different in level from one to another chrominance signal because of the difference in gain of the amplifier, addition of the output voltage from the comparator to the output video signal from the clamp circuit renders unnecessary the manual adjustment by the operator and automatically enables the true black levels of the chrominance signals to coincide with one another, even if the black levels set by the clamp circuits are different from the true black level.

BRIEF DESCRIPTION OF THE DRAWINGS

FIG. 2 shows waveforms of signals at various portions of the signal processing circuit in FIG. 1;

DETAILED DESCRIPTION OF THE PREFERRED EMBODIMENTS

Figure 1:
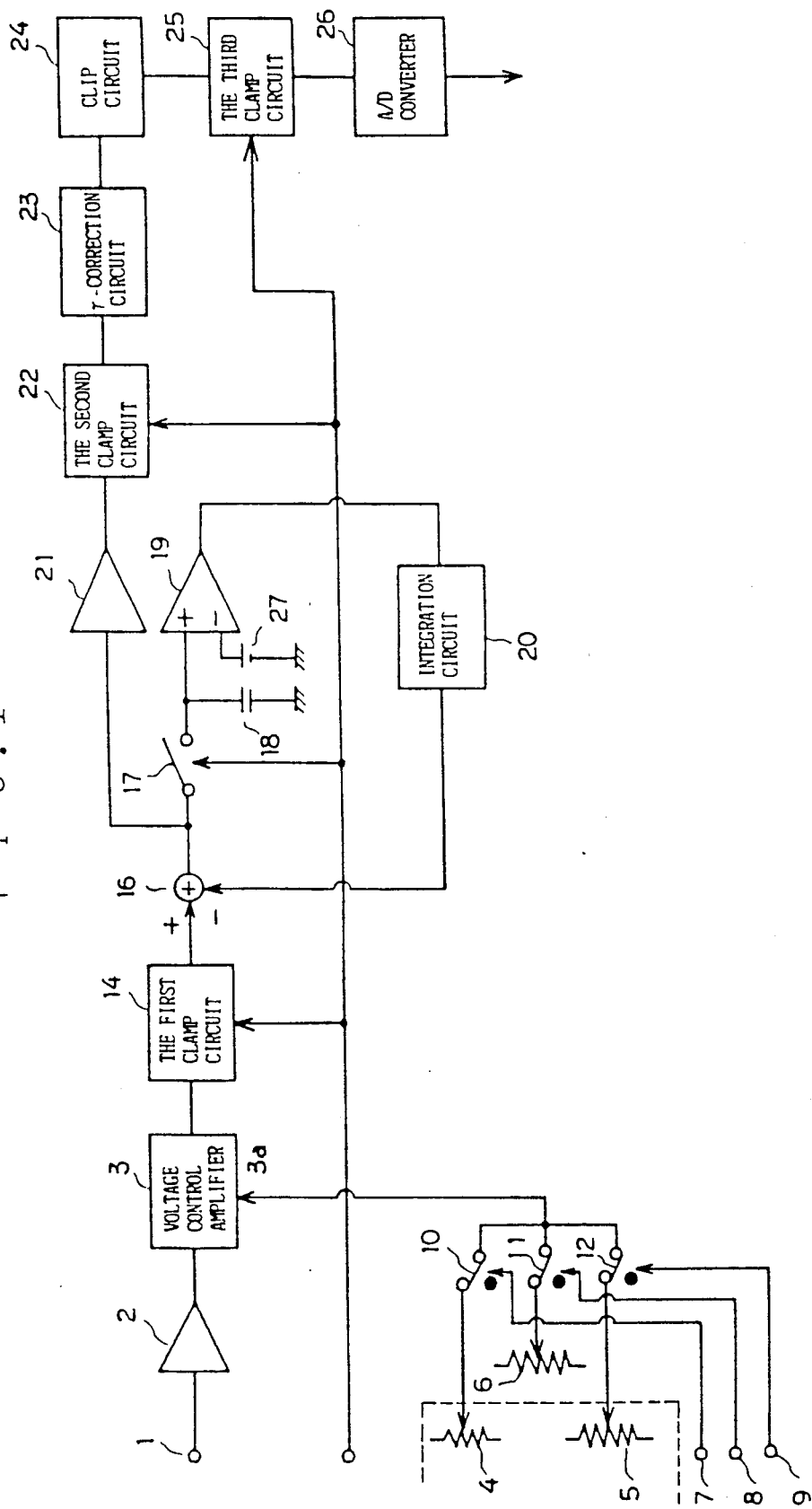
FIG. 1 is a block diagram showing the circuit configuration of the signal processing circuit according to the present invention.

FIG. 1 is a block diagram showing the circuit configuration of one embodiment of the signal processing circuit according to the present invention.

As seen from FIG. 1, the signal processing circuit has an input terminal 1 connected the input terminal of the first amplifier 2 and which receives color sequential signals from a solid-state image sensor such as CCD or the like. The first amplifier 2 has an output terminal connected to the input terminal of a voltage control amplifier 3. The gain of the amplifier 3 varies depending on the control voltage applied to a control terminal 3a thereof via switch circuits 10, 11 and 12 connected to the selected to the terminals of variable resistors 4, 5 and 6, respectively. The variable resistors 4 and 5 are provided in the scope portion of the electronic endoscope while the variable resistor 6 is provided in the signal processing circuit according to the present invention.

Figure 3:
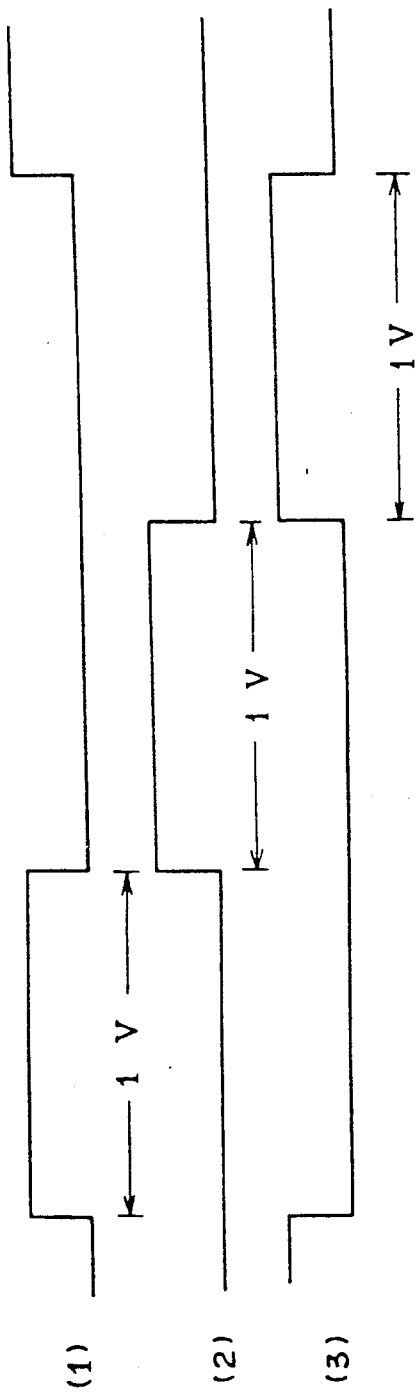
FIG. 3 shows waveforms of select signals for the switch circuits in FIG. 1.

The switch circuits 10, 11 and 12 are applied at input terminals 7, 8 and 9 thereof with switch select signals shown in FIG. 3, with which the connection of the switch circuits 10, 11 and 12 with the variable resistors 4, 5 and 5 are sequentially selected.

The variable resistors 4, 5 and 6 are applied with a DC voltage from a DC voltage source (not shown) and each sets a DC control voltage for application to the voltage control amplifier 3 when its resistance is adjusted.

The voltage control amplifier 3 has an output terminal connected to the input terminal of the first clamp circuit 14 in which the black level of input video signal is set by a control signal pulse (applied for each blanking period during a horizontal scanning period) shown in FIG. 2(8), and applied at the input terminal 15.

The first clamp circuit 14 has an output terminal connected to one input terminal of the adder 16 having an output terminal to which connected is a switch 17 on/off-controlled by the control signal pulse applied at the input terminal 15.

The switch 17 has one terminal connected to a non-inverting input terminals of a comparator 19 and a capacitor 18 grounded at the other terminal thereof.

The comparator 19 has an inverting input terminal connected to a DC voltage source 27 (reference voltage source) of which the other terminal is grounded.

The comparator 19 has an output terminal connected to the input terminal of an integration circuit 20 which eliminates high frequency noise components, the output terminal of the integration circuit 20 being connected to the other input terminal of the adder 16.

The adder 16 has an output terminal connected to the input terminal of the second amplifier 21 of which the output terminal is connected to the input terminal of the second clamp circuit 22. Similarly to the first clamp circuit 14, the second clamp circuit 22 clamps a signal supplied as timed by the control signal pulse applied at the input terminal 15, and re-sets an absolute voltage value of the black level.

The second clamp circuit 22 has an output terminal connected to the input terminal of a γ correction circuit 23 which corrects the total γ value of this image sensing system. The γ correction circuit 23 has an output terminal connected to the input terminal of a clip circuit 24 in which the dynamic range between white and black levels of a video signal supplied is clipped to a predetermined range.

The clip circuit 24 has an output terminal to which is connected the input terminal of the third clamp circuit 25 which re-sets a black level voltage of the video signal of which the dynamic range has been adjusted by the clip circuit 24. The third clamp circuit 25 has an output terminal connected to the input terminal of an A/D converter 26 which converts the analog video signal into a digital signal. The A/D converter 26 has connected to the output terminal thereof a memory (not shown) which stores in different memory areas the digital video signals separately for the chrominance signals, respectively.

Furthermore, there is provided a signal processing system (not shown) in which the R, G and B signals stored in different memory areas, respectively, are read out simultaneously, converted into analog video signals again, and encoded into a composite video signal for supply to a monitor or the like.

This embodiment of the signal processing circuit functions as will be described below with reference to FIGS. 1, 2 and 3:

The video signal delivered from the solid-state image sensor such as CCD is supplied to the input terminal 1 and amplified by the first amplifier 2. The video signal thus amplified has different levels for the R, G and B signals because of the frequency response characteristics of the solid-state image sensor, as shown in FIG. 2(1). In this video signal, noises (level $V_d$) resulted from a dark current through the image sensor and other noises are superposed on each other in the horizontal blanking period as shown in FIG. 2(2).

The video signal from the first amplifier 2 is amplified in the voltage control amplifier 3 with different gains for the respective chrominance signals so that the chrominance signals have a same peak voltage as shown in FIG. 2(3).

Namely, the voltage control amplifier 3 is supplied at the control terminal 3a thereof with a DC voltage set by means of one of the variable resistors 4, 5 and 6. As one of the switch circuits 10, 11 and 12 is selected with a pulse signal supplied from one of the input terminals 7, 8 and 9 and of which the width is equal to one vertical blanking period (1V) as shown in FIGS. 3(1), 3(2), 3(3), the DC voltage is applied to the control terminal 3a of the voltage control amplifier 3 synchronously with each chrominance signal, thus changing the gain of the voltage control amplifier 3.

As having been described in the foregoing, since the gain of the voltage control amplifier 3 is different for every chrominance signal, the noises superposed in the horizontal blanking period for the G and B signals of which the gains are larger than that of the R signal as shown in FIG. 2(3) has a higher level. If an absolute voltage value of black level is set by clamping, by the first clamp circuit 14, a chrominance signal having such noise component, the middle voltage of the noise levels of the chrominance signals will be set as an apparent black level voltage value as shown in FIG. 2(4), so that the true black level voltage values $L_1$, $L_2$ and $L_3$ will have absolute values different for respective chrominance signals as shown in FIG. 2(5).

Thus, each chrominance signal of which the black level voltage value is set by the first clamp circuit 14 is supplied through the adder 16 to the switch 17 which will be turned on with a pulse signal synchronous with the horizontal blanking period shown in FIG. 2(8) for a predetermined time (width of the pulse signal shown in FIG. 2(8)) in the horizontal scanning period so that a voltage of the peak value of the noise level in the horizontal blanking period of each chrominance signal is charged into the capacitor 18.

Since the inverting input terminal of the comparator 19 of which the non-inverting input terminal is connected to the capacitor 18 is connected to the reference voltage source 27, the comparator 19 delivers a voltage proportional to the difference between the charge voltage held in the capacitor 18 for a period of about (1V) and the reference voltage (namely, a voltage inversely proportional to the voltage of true black level of each chrominance signal as shown in FIG. 2(6)).

The noise component superposed on the voltage shown in FIG. 2(6) is eliminated by the integration circuit 20, applied to another input terminal of the adder 16, and added to chrominance signals different in true black level from one other another as shown in FIG. 2(4). Thus, the output signal from the adder 16 is corrected with the voltage shown in FIG. 2(6) as shown in FIG. 2(7), so that the black level values will result in a same voltage for each of the chrominance signals.

The video signal of which the black level is thus set for each chrominance signal is supplied to the second amplifier 21 in which it is amplified. The video signal is re-set in the black level voltage by the second clamp circuit 22, and then subject to γ correction in the γ correction circuit 23. Further the video signal is adjusted in dynamic range in the clip circuit 24, and set in black level again in the third clamp circuit 25. Thereafter, this video signal is converted into a digital signal by the A/D converter 26, and then stored in the memory (not shown).

One example in which this embodiment is adopted in an electronic endoscope will be explained herebelow.

Figure 4:
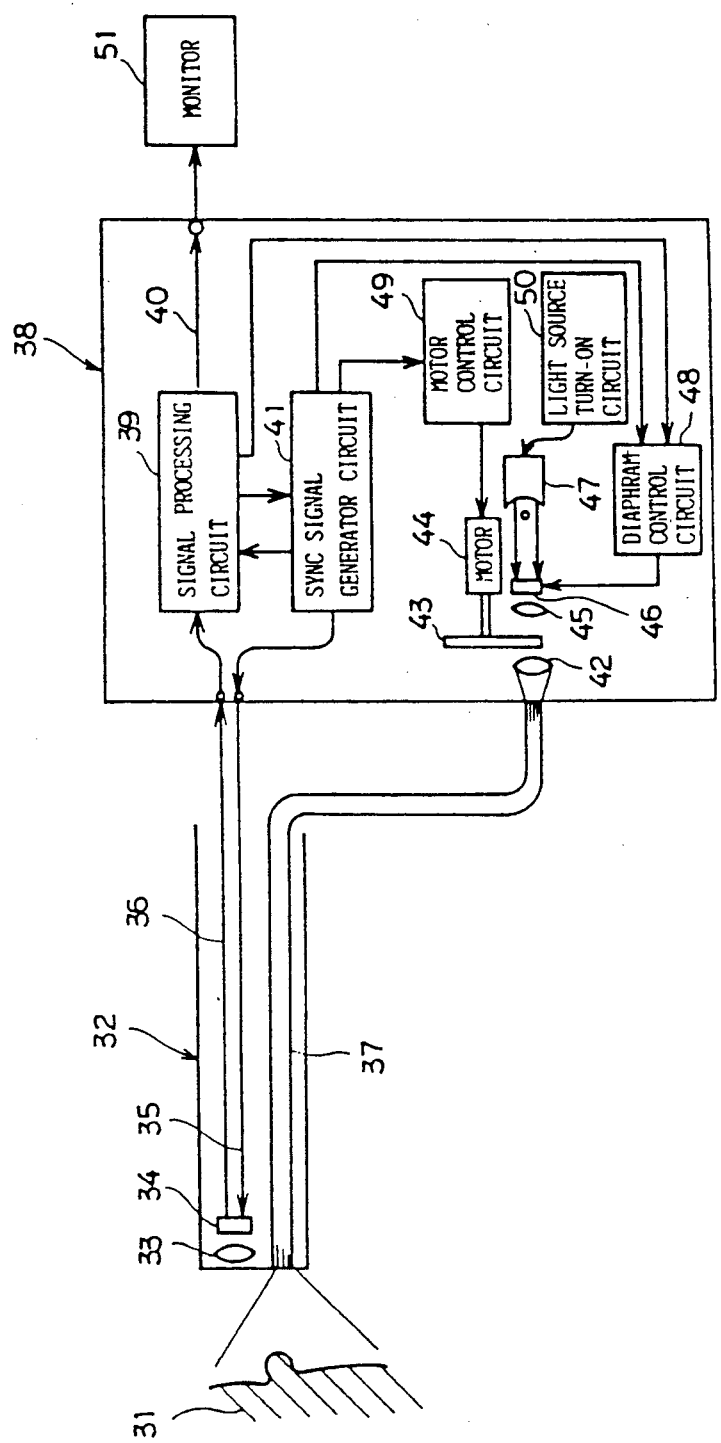
FIG. 4 is a block diagram of an application to an electronic endoscope of the signal processing circuit according to the present invention.

FIG. 4 is a block diagram showing the example in which the embodiment of the signal processing circuit according to the present invention is used in the electronic endoscope. As seen, the signal processor 38 comprising a signal processing circuit 39 is composed as will be described below.

There is provided a light source 47 which projects an illuminating light to an object 31. This light source 47 is turned on with an electric energy supplied from a light source turn-on circuit 50 and emits parallel rays of light.

A diaphragm 46 which is controlled and driven by a diaphragm control circuit 48 is provided in front thereof with the light source 47. The diaphragm control circuit 48 is supplied with a horizontal and vertical sync signals from a sync signal generator circuit 41 and also with a video signal from the signal processing circuit 39.

There is further provided in front of the diaphragm 46 a collimation lens 45 which transforms incident light rays into parallel ones, and also there is provided in front of the collimation lens 45 a rotary disc 43 which is driven by a motor. The rotary disc 43 is provided with color filter for R, G and B, respectively. Passing by the rotary disk 43, the parallel light rays from the collimation lens 45 become three R, G and B sequential light rays. Furthermore, there is provided in front of the rotary disk 43 a convergence lens 42 which converges the sequential light rays from the rotary disk 43 and makes them incident upon optical fibers 37.

A video signal delivered from a CCD 34 provided in a scope portion 32 of the electronic endoscope is supplied to the signal processing circuit 39 of the signal processor 38, in which it is subject to a variety of corrections or processings. Then the video signal thus processed is delivered through an output signal line 40 to a monitor 51 such as CRT or the like. Various sync signals required for the signal processing circuit 39, the diaphragm control circuit 48, a motor control circuit 49 which controls the motor 44, etc. are supplied from the sync signal generator circuit 41.

There are provided in the scope unit 32 of the electronic endoscope the optical fibers 37 upon which light rays converged through the convergence lens 42 are incident and which guide them to the object 31, a convergence lens 33 which converges reflected light rays from the object 31, and the CCD 34. A drive signal for the CCD 34 is supplied to the CCD 34 through a CCD drive signal line 35 from the sync signal generator 41 of the signal processor 38.

In the foregoing, an example in which the signal processing circuit according to the present invention is adopted in an electronic endoscope has been described, but the signal processing circuit according to the present invention cannot only be used in electronic endoscope but also it is applicable to all apparatuses in which a video signal composed of chrominance signals different in signal level from one another are processed as amplified with a unique gain for each chrominance signal.

What is claimed is:

1. A signal processing circuit, comprising:
an amplifying means having a voltage control amplifier for receiving a video signal comprised of chrominance signals with different signal levels, said amplifier being connected to amplify said video signals with different gains for the respective chrominance signals by supplying DC voltages set in different variable resistors to the control terminal of said voltage control amplifier via switch circuits, and means for selecting the switch circuits synchronously with the chrominance signals and a signal pulse having a width equal to one blanking period;

a first clamp circuit connected to set the black level of the video signal output from said voltage control amplifier comprising means for supplying at every blanking period during one horizontal scanning period;

a peak voltage holding means comprising a comparator having a non-inverting input terminal connected to a capacitor, one terminal of the capacitor being grounded, the comparator having an inverting input terminal connected to a reference voltage source, said comparator being responsive to the supply at the non-inverting input terminal thereof with an output video signal from an adder via a switch which is on/off-controlled with said control signal pulse to said first clamp circuit, for delivering to said adder, via an integration circuit, an output voltage proportional to the difference between the discharge voltage of said capacitor which holds the peak value of noise level in the horizontal blanking period of said video signal as a charge voltage, and the voltage from said reference voltage source;

an adder connected to receive a video signal which has a black level clamped by said first clamp circuit and a peak value provided from said peak holding means, for correcting the black level of said video signal;

a second clamp circuit connected to receive the video signal from said adder via a second amplifier, and to reset the black level of said video signal with said control signal pulse;

a γ correction circuit connected to correct the γ value of the video signal from said second clamp circuit;

a clipping circuit connected to clip the dynamic ranges between the white and black levels of said γ-corrected video signal to a predetermined range;

a third clamp circuit connected to reset the black level of the video signal from said clipping circuit with said control signal pulse; and an A/D conversion circuit connected to covert the video signal from said third clamp circuit from an analog signal to a digital signal.

* * * * *